(12) United States Patent
Wahrenberg et al.

(10) Patent No.: US 10,964,093 B2
(45) Date of Patent: Mar. 30, 2021

(54) SHADING METHOD FOR VOLUMETRIC IMAGING

(71) Applicant: Canon Medical Systems Corporation, Otawara (JP)

(72) Inventors: Magnus Wahrenberg, Edinburgh (GB); Andrew Murray, Edinburgh (GB)

(73) Assignee: Canon Medical Systems Corporation, Otawara (JP)

( * ) Notice: Subject to any disclaimer, the term of this patent is extended or adjusted under 35 U.S.C. 154(b) by 51 days.

(21) Appl. No.: 16/001,978

(22) Filed: Jun. 7, 2018

(65) Prior Publication Data

US 2019/0378324 A1    Dec. 12, 2019

(51) Int. Cl.
*G06T 15/08* (2011.01)
*G06T 7/11* (2017.01)
*G06T 15/80* (2011.01)

(52) U.S. Cl.
CPC .............. *G06T 15/08* (2013.01); *G06T 7/11* (2017.01); *G06T 15/80* (2013.01); *G06T 2207/10081* (2013.01); *G06T 2207/10088* (2013.01); *G06T 2207/10104* (2013.01); *G06T 2207/10108* (2013.01); *G06T 2207/10116* (2013.01); *G06T 2207/10132* (2013.01); *G06T 2207/30004* (2013.01)

(58) Field of Classification Search
CPC combination set(s) only.
See application file for complete search history.

(56) References Cited

U.S. PATENT DOCUMENTS

| 2005/0286748 | A1* | 12/2005 | Yang | G06T 15/08 |
| | | | | 382/128 |
| 2006/0250395 | A1* | 11/2006 | Kwon | G06T 15/06 |
| | | | | 345/424 |
| 2007/0299639 | A1 | 12/2007 | Weese et al. | |
| 2008/0246770 | A1* | 10/2008 | Kiefer | G06T 15/50 |
| | | | | 345/441 |

(Continued)

OTHER PUBLICATIONS

Lum, E.B., et al., "High Quality Lighting and Efficient Pre-Integration for Volume Rendering," May 2004, Joint EUROGRAPHICS—IEEE TCVG Symposium on Visualization, pp. 1-11 (Year: 2004).*

(Continued)

*Primary Examiner* — Andrew G Yang
(74) *Attorney, Agent, or Firm* — Oblon, McClelland, Maier & Neustadt, L.L.P.

(57) ABSTRACT

A medical image processing apparatus comprises processing circuitry configured to: obtain volumetric data corresponding to a three dimensional region of a subject; perform a sampling process that comprises sampling the volumetric data at a plurality of sampling points along a plurality of sampling paths; for each of a plurality of intervals between sampling points on sampling paths, determine a position of a shading evaluation point in the interval based on intensity values and/or opacity values for a front sampling point and back sampling point of the interval; and determine a value for a shading parameter at the determined shading evaluation point; and perform a rendering process using the determined values for the shading parameter.

17 Claims, 8 Drawing Sheets

(56) References Cited

U.S. PATENT DOCUMENTS

| | | | |
|---|---|---|---|
| 2011/0254845 A1* | 10/2011 | Oikawa | G06T 15/08 |
| | | | 345/427 |
| 2015/0022523 A1 | 1/2015 | Murray et al. | |
| 2016/0005218 A1 | 1/2016 | Day et al. | |
| 2016/0180576 A1* | 6/2016 | Schneider | G06T 15/08 |
| | | | 345/419 |
| 2020/0015785 A1* | 1/2020 | Attia | A61B 8/483 |

OTHER PUBLICATIONS

Lum, E. B. et al., "High-quality Lighting and Efficient Pre-Integration for Volume Rendering", Joint EUROGRAPHICS—IEEE TCVG Symposium on Visualization, 2004, 11 pages.

* cited by examiner

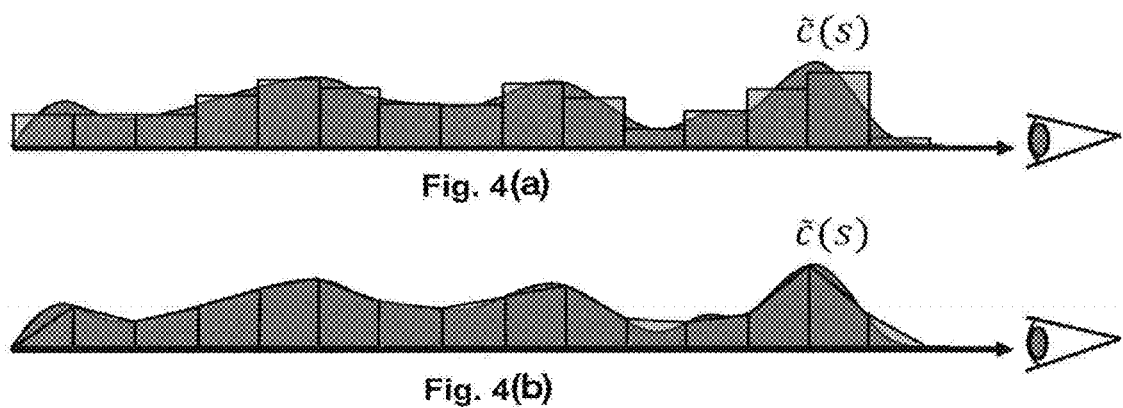
Fig. 4(a)
Fig. 4(b)
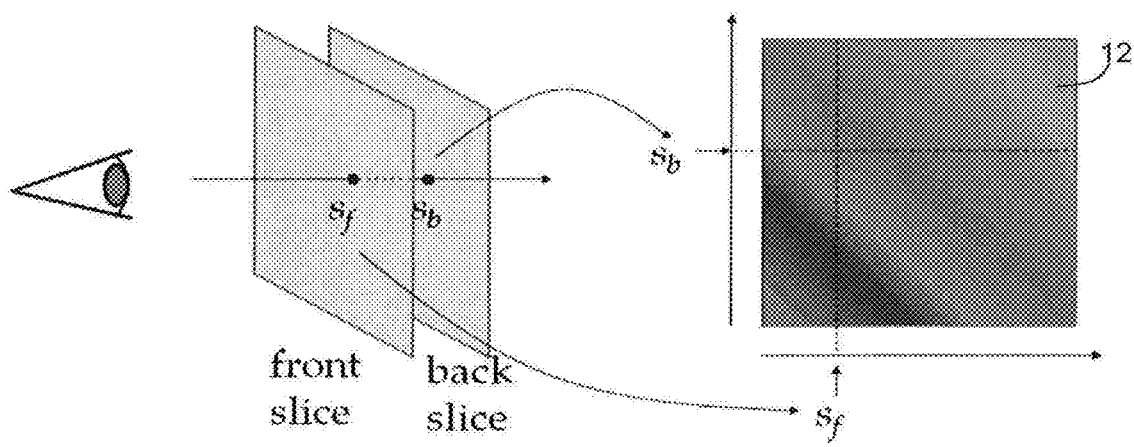
Fig. 5

SHADING METHOD FOR VOLUMETRIC IMAGING

FIELD

Embodiments described herein relate generally to a shading method for volume rendering, for example a shading method for use in shaded volume rendering (SVR) or global illumination (GI).

BACKGROUND

Volumetric medical imaging techniques that can produce three-dimensional medical imaging data using any of a variety of imaging modalities, for example CT, PET, MRI, ultrasound, and X-ray, are now widely used for imaging or diagnostic purposes.

Volumetric medical imaging data may comprise a three-dimensional array of voxels, each voxel representative of a particular position in three-dimensional space and each voxel having one or more data values. For example in the case of CT data, each voxel may have an associated intensity value which is representative of the attenuation of the applied X-ray radiation provided at the location represented by the voxel, for example the attenuation of the part of a patient's anatomy present at that location. The intensity value may be referred to as an image value, gray value, gray level, voxel value or CT value. The intensity value may be measured in Hounsfield units (HU).

A wide variety of rendering techniques are known that are used to process volumetric image data in order to display a desired representation of a patient or other subject.

For example, the volumetric image data may be rendered to display a two-dimensional projection of the three dimensional volumetric data. The two-dimensional projection may include desired texture or shading effects, and may provide an impression of a surface in three dimensions to the viewer.

Commonly used volume rendering techniques use a transfer function to map each of a series of sampled voxel values to an opacity value and a color value (usually represented by a combination of red, green and blue color values). In ray casting and similar techniques, for each pixel in the 2D projection a virtual ray is cast from the perspective of the viewer through a corresponding point on a two-dimensional virtual image plane and through the volume represented by the volumetric image data.

Shaded direct volume rendering (SVR) has become commonplace in Advanced Visualization applications. Global illumination (GI) is another type of volume rendering having a more accurate optical model.

Standards for image quality have increased since the introduction of SVR. There may be some image artifacts that were once considered to be acceptable to the viewer, but are no longer tolerated.

One image quality issue in SVR may be the presence in some SVR images of tree-ring artifacts. In some circumstances, sharp edges caused by steep ramps in the transfer function make the sampling grid interfere with the surface. The term tree-ring artifacts refers to lines resembling tree-rings or contours which appear on a surface that is intended to have more consistent coloring, for example to have gradual transitions between color values.

FIG. 1a shows an example of an image having tree-ring artifacts. FIG. 1b shows an image rendered from the same imaging data as FIG. 1a, in which the tree-ring artifacts are reduced.

FIG. 2a is a schematic illustration of a sampling process. FIG. 2a represents a two-dimensional slice of a volumetric imaging data set. A plurality of rays r1, r2, r3, r4, r5, r6, r7, r8, r9 enter the volumetric imaging data set from the left side of FIG. 2a. Each ray r1 to r9 samples the volumetric imaging data set at plurality of sampling locations s1, s2, s3, s4, s5, s6, s7, s8 along the ray. Each sampling location s1 to s8 on each ray r1 to r9 may also be referred to as a sampling grid point.

The rays r1 to r9 enter a body 10 that has a curved surface. For each ray r1 to r9, the arrow at the end of the ray r1 to r9 indicates the first sampling point on the ray r1 to r9 that is inside the body 10.

As can be seen in FIG. 2a, the planar sampling grid points land at different distances from the curved edge of the body 10. The distances between the sampling grid points and the edge of the body 10 are not random. The distances between the sampling grid points and the edge of the body 10 phase in and out and the surface of the body 10 curves around.

FIG. 2b is a plot of the distance from the boundary of the body 10 to the first interaction (sampling point) inside the body 10, for each ray r1 to r9. FIG. 2b shows the variation of the distance between the edge of the body 10 and the sampling point for each of the rays r1 to r9.

In some circumstances, neighboring rays may have highly aliased colors. For example, consider r4 and r5 of FIG. 2a. FIG. 2c shows a plot of sample values for r4. The values for samples at s1, s2 and s3 are low (below 10) and the sample value at s4 is 60. FIG. 2d shows a plot of sample values for r5. The values for samples at s1, s2 and s3 are low (below 10) and the sample value at s4 is 100.

FIG. 3 shows a transfer function using in rendering. The transfer function may also be described as a preset. The transfer function maps color values and opacity values to intensity values. In the case of FIG. 3, the intensity values are gray levels. For each gray level, the transfer function defines a color value and opacity value to be associated with that gray level.

The transfer function of FIG. 3 represents the opacity and color that are associated with each gray level for rendering. Opacity is shown on the vertical axis and gray level on the horizontal axis. Gray levels below 50 are rendered as fully transparent. Opacity increases between 50 and 65, then remains level between 65 and 80 before rising again between 80 and 100. At gray levels of 100 and above, the opacity value is 100%.

A gray level of 50 is colored yellow. The yellow color reddens as the gray value increases from 50 to 80 or so, after which the color is uniformly red. We note that the yellow and red colors have been converted into a grayscale in this illustration.

The transfer function of FIG. 3 may be used to determine color and opacity values for the gray level of s4 for ray r4 (shown in FIG. 2c) and the gray level of s4 for ray r5 (shown in FIG. 2d). According to the transfer function, sample s4 of ray r4, having a gray level of 60, is rendered in yellow and partially opaque. Sample s4 of ray r5, having a gray level of 100, is rendered in red and fully opaque. In this case, neighboring rays have highly discretized colors.

FIG. 4a is a further schematic illustration of a sampling process. Color of a sample, c(s), is sampled in discrete steps along rays cast through a volume. For a series of (usually equally spaced) sample points along the ray path through the volume, a transfer function (for example, the transfer function of FIG. 3) is used to assign opacity and color values to the sampled points. A process is then performed to combine the color and opacity values of the sampled points in sequence along the ray path to produce a single color value for that pixel.

If, for example, the opacity of the first sampled point is high, as determined by the transfer function based on the measured intensity value for that point, then the color of the corresponding pixel may be determined entirely, or almost entirely, by the color value for that sampled point, as the virtual ray effectively does not penetrate into the volume beyond that initial high opacity point. If the opacity values of the first points in the series of sampled points are relatively low then the color of the corresponding pixel may be determined from a combination of the color values for those sampled points in the series up to the point where the accumulated opacity reaches a sufficiently high value.

The color and opacity values are only determined at discrete sampling points. A series of blocks in FIG. 4a represent the calculated color values for the sampling points. It can be seen that there may be substantial changes in value between one sampling point and the next sampling point.

The simple sampling approach illustrated in FIG. 4a and FIGS. 2a to 2d may be vulnerable to volatility in the transfer function and in the data sampled. The simple sampling approach may result in tree-ring artifacts as illustrated in FIG. 1a.

One known method that may reduce tree-ring artifacts is a standard technique called pre-integration, which is illustrated in FIGS. 4b and 5.

Pre-integration is a technique that involves using colors that are pre-computed for a sample interval between adjacent sampling points. The results of the pre-computations are stored in a 2D look-up table. The 2D look-up table stores a pre-computed value for each combination of front sample intensity value and back sample intensity value. Corresponding opacity and color values for each possible pair of intensity values and sample spacings are pre-computed using the transfer function and stored in the look-up table.

The 2D look-up table provides pre-computed color values for use in rendering. For each successive pair of samples along the ray path, indicated as front slice (Sf) and back slice (Sb) in FIG. 5, a renderer looks up the pre-computed color and opacity value for that pair of samples from a 2D look-up table that corresponds to that pair of sampled intensity values and that sample spacing.

The 2D look-up table is represented graphically in FIG. 5 as a 2D intensity plot 12. The horizontal axis of the 2D intensity plot is the intensity value for the sampling point on the front slice, Sf. The vertical axis of the 2D intensity plot is the intensity value for the sampling point on the back slice, Sb. The intensity plot 12 shows pre-integrated colors for each pair of intensity values. In the example of FIG. 5, the pre-integrated colors are RBG colors. However, they are represented as grayscale in FIG. 5 for ease of reproduction.

The sampling point that the ray reaches first may be referred to as the front sample, and the other sampling point of the pair may be referred to as the back sample. In general, front and back refer to the direction of travel of the ray, with points that the ray reaches earlier being described as being in front of points that the ray reaches later. The interval between the front sampling point and the back sampling point may be referred to as a span.

The pre-integration approach presumes that for each pair of sampled intensity values, the intensity varies linearly (or in some other specified way) in the interval between the sampled points. The stored value in the look-up table for a particular pair of sampled intensity values can be considered to represent averaged opacity and color values of the transfer function for the range of intensities between the two sampled intensity values.

The use of the 2D pre-integration can turn the estimate provided by the sampling approach of 4a to a smoother estimate, as illustrated schematically in FIG. 4b. Effectively, each discrete block of FIG. 4a is now replaced by a pre-computed integral of the transfer function between the two samples. This computation is subject only to the sampling rate and the transfer function, independent of the volume data, the viewing angle and other rendering parameters. The 2D pre-integration approach may be considered to provide a slab-by-slab rendering process rather than slice-by-slice rendering process for each pixel. The 2D pre-integration approach may provide a smoothing to counteract volatility in the transfer function and in the data sampled.

A simple numerical sampling approach, for example as described with reference to FIG. 4a, may lead to artifacts such as the tree ring artifacts shown in FIG. 1a that results from a thin skin layer going un-sampled in particular areas due to the discretization of the simple numerical approach. The 2D pre-integration approach of FIGS. 4b and 5 may capture skin detail more accurately, for example as shown in FIG. 1b.

The pre-integration algorithm takes into account the transfer function not only at the sampling grid points but on the whole interval between a front and back sampling point.

The grayscale signal is often modelled as a linear function between a front and back sample. For each pair of possible front and back samples, the true integral may be pre-computed and cached. The sampling grid does not change when pre-integration is used. Only the integration method is changed by the use of pre-integration. In order to support a continuous linear model, two samples (front and back) form a ray span with a precomputed accurate interval.

A shading function used in rendering (for example, an SVR or GI rendering) may also be considered to interfere with the sampling grid. Shading artifacts due to the evaluation of the shading function on a fixed grid may result in a loss of image quality. Shading calculations may suffer from discretization effects. The discretization effects in shading calculations may be considered to be similar in some ways to the tree ring artifacts described above (which were due to discretization of color).

Shading may be performed by, for example, calculating a gradient at each sampling point and applying shading based on the calculated gradients. However, a value for gradient may change rapidly near surfaces. A surface angle may change very rapidly between sampling points.

The position from which an irradiance is calculated in global illumination may also be considered to interfere with a sampling grid. It may not be possible to easily pre-integrate the position from which irradiance is calculated as it forms a double integral with the main ray path.

A global illumination algorithm may estimate an irradiance at a point by reading a value from a cached irradiance; by casting one or many rays to determine the irradiance; or by reading the irradiance at a fixed distance from the point and refining the value by attenuating it in a fixed number of steps.

The exact point at which to evaluate the irradiance between the front and back sample may be important and may be a source of aliasing. In some circumstances, there may be a fast-changing irradiance gradient. Often, but not always, the irradiance may be fast-changing when the gradient is fast-changing.

One option for improving shading may be to perform a super-sampling. The super-sampling may comprise sampling using a smaller sampling interval, which may reduce discretization effects. However, super-sampling may make the rendering process extremely slow.

BRIEF DESCRIPTION OF THE DRAWINGS

Embodiments are now described, by way of non-limiting example, and are illustrated in the following figures, in which:—

FIG. 2b is a plot of distance from boundary to first interaction for the virtual rays of FIG. 2a;

FIGS. 2c and 2d are plots of sample values for respective rays of FIG. 2a;

FIGS. 4a and 4b are schematic representations of samplings along a ray path through a volume;

FIG. 5 is a representation of a 2D look-up table mapping pairs of sampled intensities to opacity and/or color;

DETAILED DESCRIPTION

Certain embodiments provide a medical image processing apparatus comprising processing circuitry configured to: obtain volumetric data corresponding to a three dimensional region of a subject; perform a sampling process that comprises sampling the volumetric data at a plurality of sampling points along a plurality of sampling paths;

for each of a plurality of intervals between sampling points on sampling paths, determine a position of a shading evaluation point in the interval based on intensity values and/or opacity values for a front sampling point and back sampling point of the interval; and determine a value for a shading parameter at the determined shading evaluation point; and perform a rendering process using the determined values for the shading parameter.

Certain embodiments provide a medical image processing method comprising: obtaining volumetric data corresponding to a three dimensional region of a subject; performing a sampling process that comprises sampling the volumetric data at a plurality of sampling points along a plurality of sampling paths; for each of a plurality of intervals between sampling points on sampling paths, determining a position of a shading evaluation point in the interval based on intensity values and/or opacity values for a front sampling point and back sampling point of the interval; and determining a value for a shading parameter at the determined shading evaluation point; and performing a rendering process using the determined values for the shading parameter.

Figure 6:
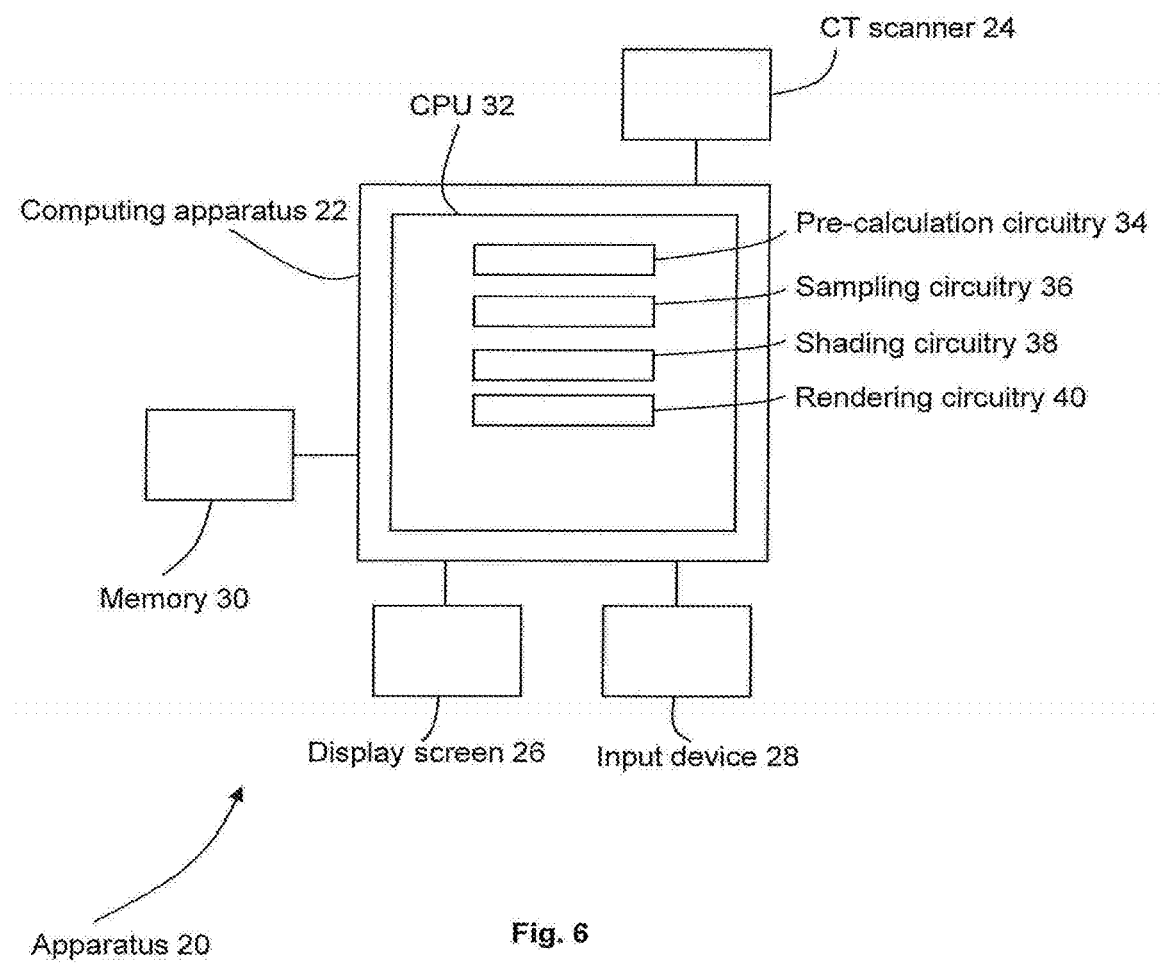
FIG. 6 is a schematic illustration of a medical image processing apparatus in accordance with an embodiment.

A medical image processing apparatus 20 according to an embodiment is illustrated schematically in FIG. 6. The medical image processing apparatus 20 comprises a computing apparatus 22, in this case a personal computer (PC) or workstation, which is connected to a CT scanner 24, one or more display screens 26 and an input device or devices 28, such as a computer keyboard, mouse or trackball.

The CT scanner 24 may be any CT scanner that is configured to obtain volumetric medical imaging data of a region of a patient. In alternative embodiments, the CT scanner 24 may be replaced or supplemented by a scanner in any other volumetric imaging modality, for example an MRI (magnetic resonance imaging) scanner, ultrasound scanner, Cone Beam CT scanner, X-ray scanner, PET (positron emission tomography) scanner, or SPECT (single photon emission computed tomography) scanner.

In the present embodiment, volumetric image data sets obtained by the CT scanner 24 are stored in memory 30 and subsequently provided to computing apparatus 22. In an alternative embodiment, image data sets are supplied from a remote data store (not shown) which may form part of a Picture Archiving and Communication System (PACS). The memory 30 or remote data store may comprise any suitable form of memory storage.

Computing apparatus 22 provides a processing resource for automatically or semi-automatically processing image data sets, and comprises a central processing unit (CPU) 32.

The computing apparatus 22 includes pre-calculation circuitry 34 for pre-calculating a most visible point function; sampling circuitry 36 for sampling the volumetric imaging data along a plurality of sampling rays; shading circuitry 38 for executing a shading function; and rendering circuitry 40.

In the present embodiment, the various circuitries are each implemented in the CPU and/or GPU of computing apparatus 22 by means of a computer program having computer-readable instructions that are executable to perform the method of the embodiment. However, in other embodiments each circuitry may be implemented in software, hardware or any suitable combination of hardware and software. In some embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 6 for clarity.

Figure 7:
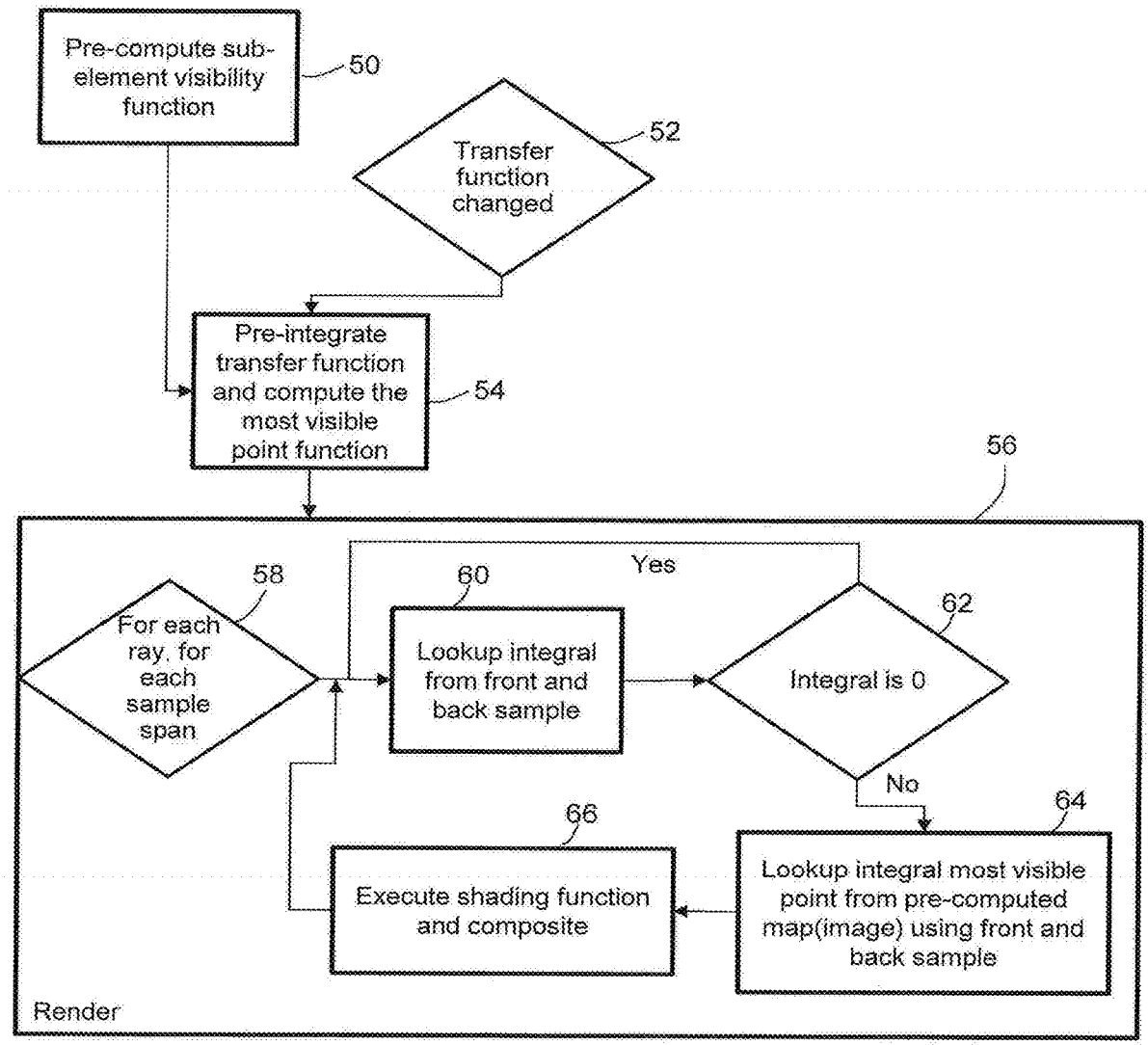
FIG. 7 is a flow-chart illustrating in overview a process of an embodiment.

The apparatus of FIG. 6 is configured to perform a process as illustrated in overview in the flow chart of FIG. 7.

As described above, the calculation of a shading function at sampling points may result in artifacts due to discretization. In pre-integration methods, color is pre-integrated in a span between sampling points. However, integrating lighting across a span between sampling points may be complex and expensive.

The process of FIG. 7 keeps a single evaluation of the shading function per span. However, the position at which the shading function is evaluated (which may be referred to as the shading evaluation point or shading calculation point) is determined based on the intensity values at the front and back sampling points. In the embodiment of FIG. 7, the shading function is evaluated at the point along the span between sampling points that contributed most to the integral when color was pre-integrated. The point along the span between sampling points that contributed most to the integral may be referred to as the most visible point.

We turn to the flow chart of FIG. 7. At stage 50 of the flow chart, the pre-calculation circuitry 34 pre-calculates a sub-element visibility function. The sub-element visibility function is a function that relates opacity values at the front and back of an interval to a most visible position within that interval, which may be referred to as a most visible fraction. In the present embodiment, the sub-element visibility function does not take into account intensity value (for example, CT value) for the front and back of the interval. The sub-element visibility function is therefore independent of a preset used. The sub-element visibility function is not dependent on a transfer function. The sub-element visibility function may also be referred to as a precomputed static function.

The most visible fraction is a value between 0 and 1, where 0 represents the front of the interval (the point that is reached first by a virtual ray) and 1 represents the back of the interval (the point that is reached last by the virtual ray). Opacity values are represented by percentages from 0% (fully transparent) to 100% (fully opaque).

Any suitable method may be used to calculate the sub-element visibility function. In the present embodiment, the sub-element visibility function is calculated by the pre-calculation circuitry 34 as described below. In other embodiments, the pre-calculation circuitry 34 may receive a pre-determined sub-element visibility function, for example from any suitable circuitry, apparatus or data store. In further embodiments, no sub-element visibility function is used and stage 50 may be omitted from the process of FIG. 7.

In the present embodiment, the pre-calculation circuitry 34 determines a respective most visible fraction for each of a plurality of pairs of front and back opacity values. The pre-calculation circuitry 34 uses a linear opacity model to estimate opacity value at a series of intermediate points between a front point having a front opacity value and a back point having a back opacity value. In other embodiments, any suitable opacity model may be used to determine opacity value at the intermediate points. For example, a linear, quadratic or cubic polynomial may be used.

The pre-calculation circuitry 34 uses the estimated opacity values for the intermediate points to determine a most visible position within the interval.

We consider a virtual light ray passing from the front point to the back point of the interval. At each intermediate point, a proportion of the light in the ray may be attenuated in accordance with the opacity value of the intermediate point. If the opacity value of the intermediate point is high, a large proportion of the light may be absorbed. If the opacity value of the intermediate point is low, a low proportion of the light may be absorbed.

If the opacity value of the front point is high, opacity values for intermediate points that are near the front point will also be high, in accordance with the linear opacity model. Light from the ray may not penetrate far into the interval. It may therefore be expected that the most visible intermediate point may be at or near the front point.

If the opacity value of the front point is low, and the opacity value of the back point is higher, it may be expected that intermediate points near the back point may have higher visibility. However, the extent to which each intermediate point blocks intermediate points behind it must be taken into account.

In the present embodiment, the pre-calculation circuitry 34 determines a respective most visible fraction for front and back opacity values for the full range of possible opacity values from 0% to 100%. The opacity values are discretized, for example using increments of 1%. In other embodiments, any suitable discretization increment may be used. In further embodiments, a most visible fraction may be calculated for only part of the range of opacity values, for example omitting very low or very high opacity values. In some embodiments, most visible fractions are only calculated for ranges of values for which artifacts have been observed.

Figure 8:
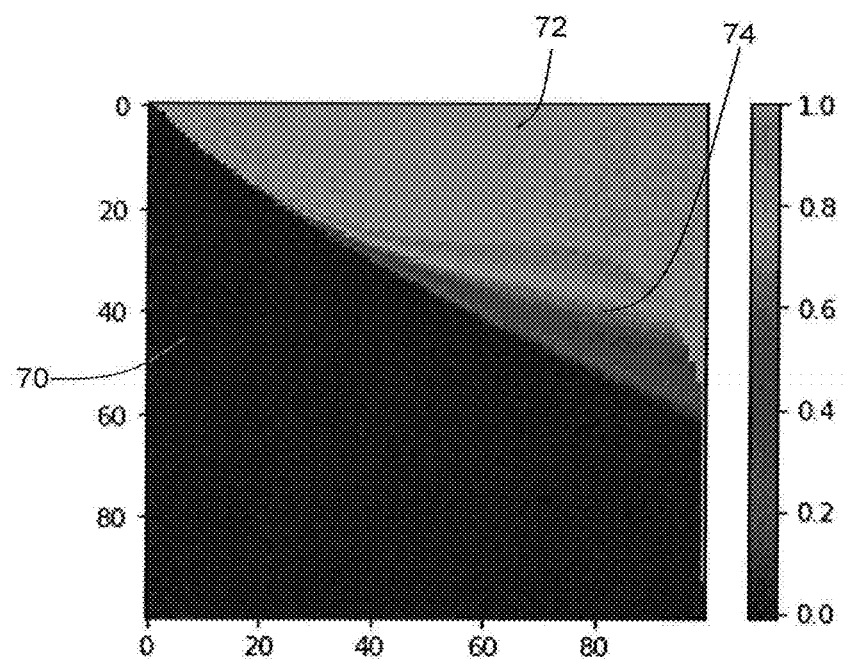
FIG. 8 is a plot of most visible fraction as a function of front sample opacity and back sample opacity.

FIG. 8 is a plot of most visible fraction as a function of front opacity value and back opacity value. Front opacity value is plotted on the vertical axis, with 0% front opacity value at the top of the plot and 100% front opacity value at the bottom of the plot. Back opacity value is plotted on the horizontal axis, with 0% back opacity value at the left of the plot and 100% back opacity value at the right of the plot.

Most visible fraction is plotted on a scale of 0 (front sampling point is most visible) to 1 (back sampling point is most visible). Values between 0 and 1 represent a fraction of the interval between the front sampling point and the back sampling point. For example, a value of 0.5 for most visible fraction indicates that the most visible point lies halfway between the front point and the back point.

It may be seen from FIG. 8 that when the front opacity value is high, the most visible fraction is always 0, which indicates that the most visible point is always at the front point. There is a large region 70 of FIG. 8 in which the most visible fraction is at or near zero.

In contrast, when the back opacity value is high, the position of the most visible point is dependent on the front opacity value. If both front opacity value and back opacity value are high, the most visible point will be at or near the front point. If the back opacity value is higher than the front opacity value, the most visible point may be nearer the back point (depending on the exact opacity values).

There is a region 72 at the top of the graph (low front opacity value) in which the most visible fraction is at or near 1.

There is also a part 74 of the graph in which the most significant shading point is somewhere in the middle of the interval. This part of the graph includes certain pairs of values having front opacity values between around 20 and 60 and back opacity values between around 30 and 100. The existence of this part of the graph shows that simply selecting the front or back of the interval may not be a good approximation for the most visible point in some circumstances.

The sub-element visibility function is stored by the pre-calculation circuitry 34. It may be stored in any suitable format, for example as an image, function, or look-up table. In some elements, the sub-element visibility function is filtered to reduced or prevent sharp transitions from front to back. In some embodiments, a Gaussian 2D image filter is used to filter the sub-element visibility function. The use may set a sigma parameter of the Gaussian kernel of the Gaussian 2D image filter to adjust a constraint.

At stage 52 of FIG. 7, the pre-calculation circuitry 34 receives a transfer function, which may also be described as a preset. The transfer function maps color values and opacity values to intensity values. For each intensity value, the transfer function defines a color value and opacity value to be associated with that intensity value.

The transfer function of stage 52 may have recently been changed, for example changed by a user. Changing a transfer function may comprise changing which colors and/or opacities are mapped to which intensity values. Different transfer functions may be used, for example, to highlight different anatomical features.

Figure 1A:
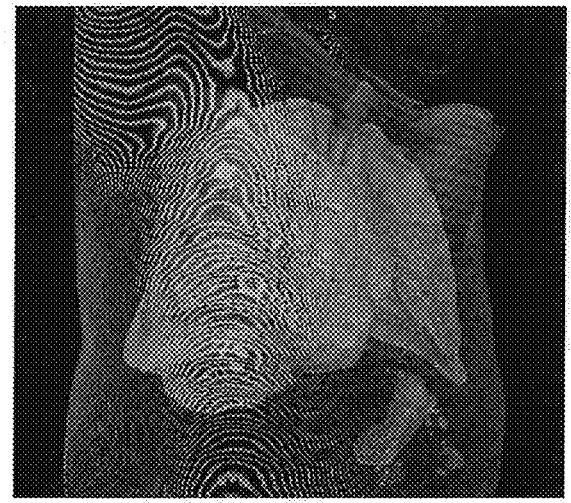
FIG. 1a is a rendered medical image having tree-ring artifacts.
Figure 1B:
FIG. 1b is a medical image rendered from the same data as FIG. 1a, and having reduced tree-ring artifacts.
Figure 2A:
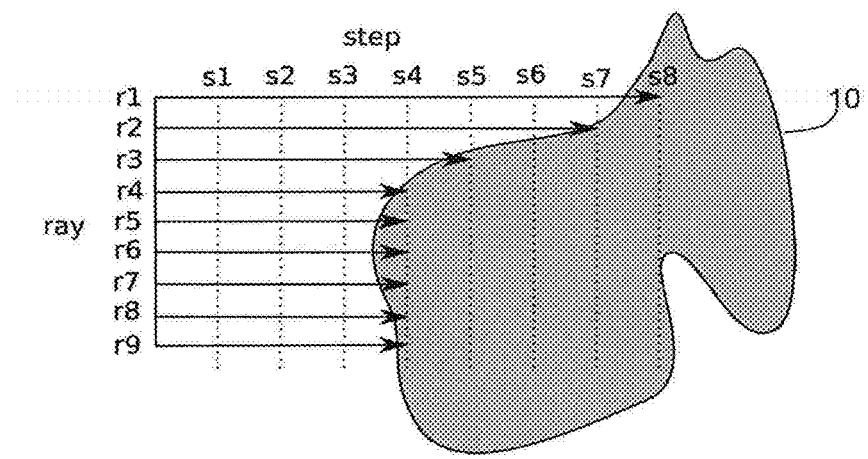
FIG. 2a is a schematic illustration of virtual rays passing into the surface of a body.
Figure 2B:
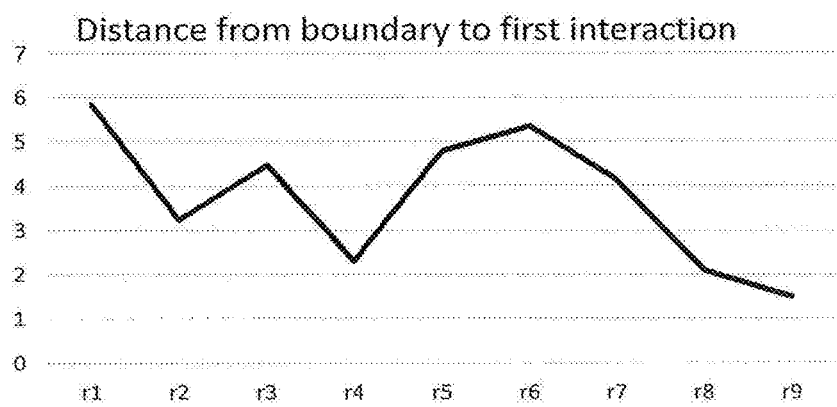
Figures 2C, 2D:
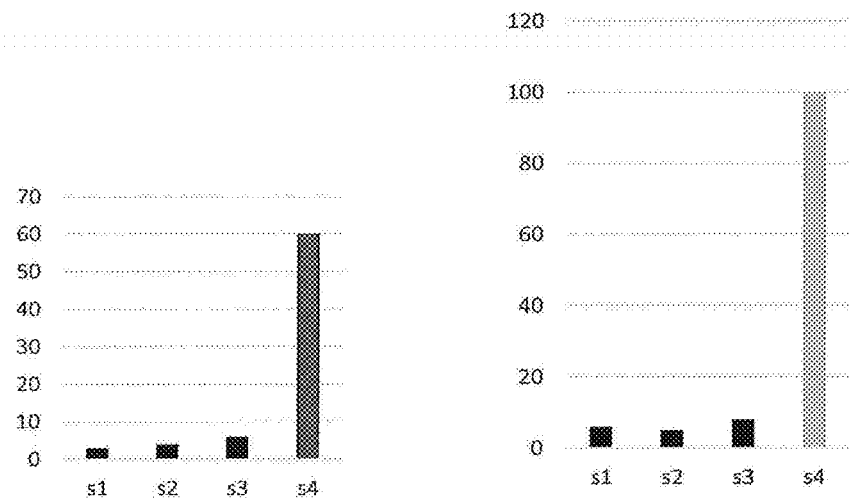
Figure 3:
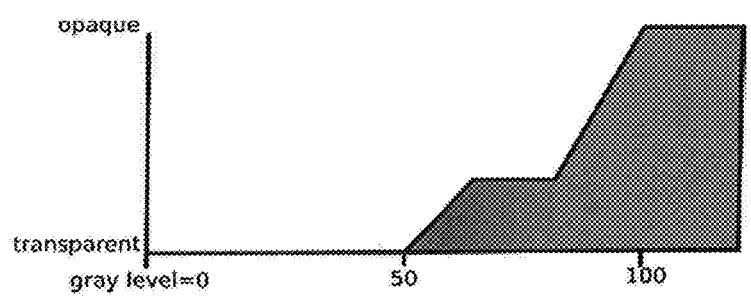
FIG. 3 is a representation of a transfer function mapping gray levels to color values and opacity values.

In the present embodiment, the transfer function is as shown in FIG. 3 and described above. Opacity is 0% up to an intensity value of 50, increases to 65, levels off until 80, and then increases to 100% at an intensity level of 100. Color is yellow at an intensity value 50 and gradually changes to red as intensity value increases (not shown on FIG. 3). In other embodiments, any suitable transfer function may be used.

At stage 54, the pre-calculation circuitry 34 performs a pre-integration using the transfer function of stage 52. The pre-calculation circuitry 34 assumes a linear model between a front sampling point and a back sampling point. According to the linear model, intensity value changes linearly between the front sampling point and the back sampling point. The linear change in intensity is used to pre-integrate color values over the interval, to obtain a pre-integrated color value for the interval.

In the present embodiment, the pre-integration is performed using the equation:

$$E = \int_{front}^{back} T(s)\tau(s)c_r(s)$$

where E is the preintegrated colour for the interval between the front sampling point and the back sampling point; s is a distance along the ray; $T(s)$ is a transmission at s (which is representative of how much of the light reflected from that point reaches the eye/camera); $\tau(s)$ is an opacity at s; and $c_r(s)$ is the color from the color table (transfer function). In the present embodiment, only one light is used for illumination. In other embodiments, multiple lights may be used.

In other embodiments, pre-integration may be performed using any suitable integration method, for example an integration method as described in Nelson Max and Min Chen, *Local and Global Illumination in the Volume Rendering Integral*, Scientific Visualization: Advanced Concepts; Editor: Hans Hagen; pp 259-274.

As described above, different parts of the interval may have different contributions to the color of the interval. If the front sampling point is fairly opaque, the color may be mostly determined by a region at the front of the interval. If the front sampling point is more transparent, the back of the interval may contribute more to the overall color of the interval.

The pre-calculation circuitry 34 stores pre-integrated color values for pairs of sampling points as described above. In the present embodiment, the pre-integrated color values are stored as a transfer function (which may be, for example, similar to the transfer function 12 of FIG. 5 as described above). The transfer function may be stored in any suitable format, for example as an image, function, or look-up table.

In the present embodiment, along with the pre-integration of color for each pair of sampling point intensity values, the pre-calculation circuitry also calculates a most visible point function for the pair of sampling point intensity values.

The most visible point function is a function that relates intensity values (for example, CT values) at the front and back of an interval to a most visible position within that interval, which may be referred to as a most visible fraction. It differs from the sub-element visibility function described with reference to stage 50 in that the most visible point function of stage 54 takes into account intensity values as well as opacities. The most visible point function may also be referred to as a most visible point map.

In the present embodiment, the computing of the most visible point function by the pre-calculation circuitry 34 is based on the transfer function of stage 52 and the sub-element visibility function of stage 50. In other embodiments, the computing of the most visible point function may be based only on the transfer function. In further embodiments, any suitable method may be used to determine the most visible point function.

In the present embodiment, the most visible point function is calculated by the pre-calculation circuitry 34 as described below. In other embodiments, the pre-calculation circuitry 34 may receive a predetermined most visible point function, for example from any suitable circuitry, apparatus or data store.

The pre-calculation circuitry 34 determines a respective most visible fraction for each of a plurality of pairs of front and back intensity values. The most visible fraction is a value between 0 and 1, where 0 represents the front of the interval and 1 represents the back of the interval. The intensity values are represented on any suitable scale. For example, in the present embodiment, the intensity values are CT values in a range of 0 to 120.

The pre-calculation circuitry 34 estimates intensity values for intermediate points between the front of the interval and the back of the interval. In this context we will refer to the intermediate points between the front of the interval and the back of the interval as sub-sampling points.

The pre-calculation circuitry 34 uses a linear model to estimate intensity values at a series of sub-sampling points between a front point having a front intensity value and a back point having a back intensity value. The linear model may be the same linear model as was used in the pre-integration of color described above. In other embodiments, any suitable model may be used to determine intensity value at the sub-sampling points. For example, a linear, quadratic or cubic polynomial may be used.

The pre-calculation circuitry 34 then uses the transfer function of stage 52 to map a respective opacity value to each of the sub-sampling points, based on the estimated intensity value at that sub-sampling point. For some pairs of sampling point intensity values, the opacity values may change in a non-linear fashion across the interval between the sampling points, since the opacity values of the sub-sampling points are dependent on the intensity values at the sub-sampling points and on the transfer function. In some circumstances, the transfer function may have sharp transitions in opacity value between neighboring intensity values.

The pre-calculation circuitry 34 calculates the most visible point between the front point and the back point.

In the present embodiment, the pre-calculation circuitry 34 determines a respective most visible fraction for front and back intensity values for the full range of intensity values from 0 to 120. The intensity values are discretized, for example using increments of 1. In other embodiments, any suitable discretization increment may be used. In further embodiments, a most visible fraction may be calculated for only part of the range of intensity values, for example omitting pairs of intensity values where both intensity values are below 50 (and therefore, with this transfer function, would be fully transparent). In some embodiments, most visible fractions are only calculated for ranges of values for which artifacts have been observed.

Figure 9:
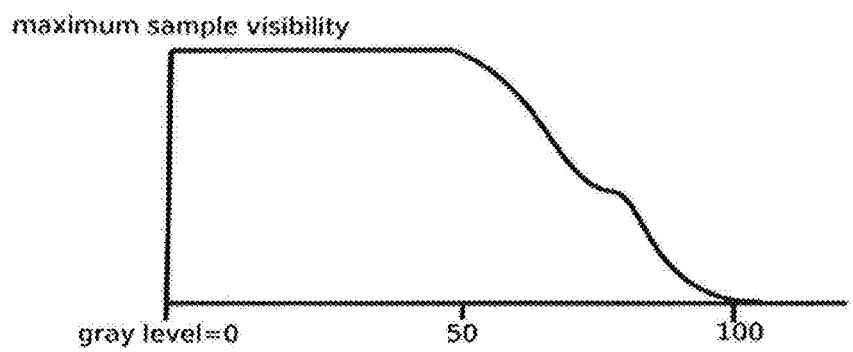
FIG. 9 is a plot of maximum sample visibility against gray level.
Figure 10:
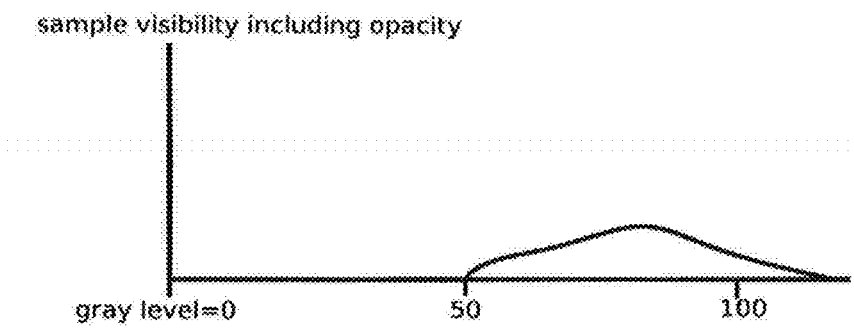
FIG. 10 is a plot of sample visibility including opacity against gray level.

FIGS. 9 and 10 illustrate an example of a calculation of most visible fraction for an interval in which the front intensity value is 0 and the back intensity value is 120. The example of FIGS. 9 and 10 uses the transfer function of FIG. 3, in which samples below 50 are transparent, samples of 50 to 100 are partially transparent, and samples above 100 are opaque.

The pre-calculation circuitry 34 estimates intensity values for sub-sampling points between the front point of the interval and the back point of the interval based on a linear model. Intensity value changes linearly from 0 to 120 across the interval.

FIG. 9 is a graph that shows how light from a virtual light ray is absorbed as it passes through an interval between a front point and a back point. The quantity plotted on the y axis is a maximum sample visibility, which may also be described as an unobscured visibility or as a pixel contribution. The pixel contribution represents how much light remains in the virtual light ray. The amount of the pixel contribution declines as light from the virtual light ray is absorbed. The x axis shows distance through the interval from front point to back point. The scale on the x axis is shown as gray value (intensity value) with x=0 being the front point and x=120 being the back point.

At the left hand side of the plot, there is 100% of the pixel contribution remaining. This remains the same while the intensity value stays below 50, because sub-sampling points with intensity values are fully transparent in accordance with the transfer function. As the virtual ray progresses further into the interval, the image level increases and sub-sampling points become partially transparent. The pixel contribution declines over the range of intensity values for which sub-sampling points are partially transparent, and becomes 0 at an intensity value of 100, at which the sub-sampling points become fully opaque.

FIG. 10 is a plot of sample visibility including opacity against distance across the interval (in units of gray level). FIG. 10 may be considered to be a product of the transfer function of FIG. 3 and the pixel contribution plot of FIG. 9.

The contribution of any sub-sampling point in the interval to an integral across the interval is determined by the transfer function (which maps the intensity value at that sub-sampling point to color and opacity) and by how much of the pixel contribution remains once the ray reaches the sub-sampling point.

At intensity values below 50, the sub-sampling points are transparent and the pixel contribution remains at 100% as described above. In the region of intensity values just above 50, the opacity values in the transfer function are quite low and therefore the visibility remains quite low. As intensity value increases from 50 to 75, the visibility increases as the opacity values increase. However, once intensity value increases above 75, although the opacity is still increasing, the pixel contribution has decreased due to absorption in the 50 to 75 region (as shown in FIG. 9). It may be considered that the drop in remaining pixel contribution out-races the increase in opacity due to the transfer function, and visibility declines.

In the case of an interval from 0 to 120, for this preset, the most visible point is at 75. The most visible fraction is therefore 75/120.

In the present embodiment, the sub-element visibility function that was pre-calculated at stage 50 is used to refine the calculation of the most visible point function that has been obtained using the transfer function. In other embodiments, no such refinement of the calculation of the most visible point function is performed.

The pre-calculation circuitry 34 considers each of the sub-intervals between the sub-sampling points. The pre-calculation circuitry 34 determines which of the sub-intervals has the highest visibility (makes the highest contribution to the pre-integral).

The pre-calculation circuitry 34 then determines the most visible point within that sub-interval by applying the sub-element visibility function to the sub-interval. The pre-calculation circuitry considers a front sub-sampling point at the front of the sub-interval, and a back sub-sampling point at the back of the sub-interval. The pre-calculation circuitry 34 uses the sub-element visibility function to determine the most visible point within the sub-interval, using the stored most visible fraction.

In the example of FIG. 9 and FIG. 10, the most visible sub-interval may be an sub-interval between intensity values 74 and 75. The pre-calculation circuitry 34 looks up the opacity of each of the intensity values using the transfer function, and determines that each has an opacity of 30%. Using the sub-element visibility function of FIG. 8, the pre-calculation circuitry 34 determines that the most visible point is at the front of the sub-interval.

Although in the example shown the most visible point is at the front of the sub-interval, this may not always be the case, as explained above with reference to the sub-element visibility function. In some circumstances, the most visible point may be nearer to the back of the sub-interval.

The pre-calculation circuitry 34 determines the most visible point for each pair of front and back intensity values by determining a most visible sub-interval and then refining the position of the most visible point within that sub-interval. In other embodiments, the refinement of the position is omitted.

The pre-calculation circuitry 34 stores a most visible point function which relates most visible point to front and back intensity values. The pre-calculation circuitry 34 may store the most visible point function in any suitable format, for example as an image, function, or look-up table.

Although the pre-integration process and the computing of the most visible point function are described above as separate processes for clarity, in practice at least part of the computing of the most visible point function may be performed together with the pre-integration process. Calculations performed as part of the pre-integration process may also be used in the computing of the most visible point function. The most visible sub-interval may be the sub-interval that contributes the most to the integral of the pre-integration process.

At stage 56, the rendering circuitry 40 receives from the pre-calculation circuitry 34 the pre-integrated transfer function and most visible point function that were calculated at stage 54. In other embodiments, the rendering circuitry 40 may receive the pre-integrated transfer function and most visible point function from any suitable circuitry, apparatus or data store.

The rendering circuitry 40 receives from the data store 30 a set of volumetric medical imaging data that has been acquired by the CT scanner 24. The volumetric medical imaging data set is representative of an anatomical region of a subject, for example a patient. In other embodiments, the volumetric medical imaging data set may comprise data of any suitable modality or modalities.

The rendering circuitry 40 renders an image from the volumetric medical imaging data set using the sampling circuitry 36 and shading circuitry 38. The rendering comprises a shading process that comprises evaluating a shading function at the most visible points in sampling intervals.

Stage 56 comprises sub-stages 58, 60, 62, 64 and 66, which are described in turn below.

At sub-stage 58, the sampling circuitry 36 casts a plurality of virtual rays into the volume of the volumetric medical imaging data set. Each virtual ray comprises a plurality of sample spans, where a sample span is an interval between two adjacent sampling points.

For each sample span of each ray, the sampling circuitry 36 obtains an intensity value for the first sampling point at the start of the span (which is referred to as the front sampling point) and an intensity value for the second sampling point at the end of the span (which is referred to as the back sampling point). For example, the sampling circuitry 36 may obtain the intensity values for the each of the sampling points by interpolating intensity values from neighboring voxels.

Sub-stages 60 to 66 are then performed for each sample span of each ray.

At sub-stage 60, the sampling circuitry 36 looks up the pre-integrated integral for the intensity value for the front sampling point and the intensity value for the back sampling point. The pre-integrated integral is as determined at stage 54. The pre-integrated integral returns a color value for the sample span.

At sub-stage 62, the sampling circuitry 36 asks whether the pre-integrated integral of sub-stage 60 is zero. If the pre-integrated integral is zero, the process returns to sub-stage 58 for the next span. If the pre-integrated integral is non-zero, the process proceeds to sub-stage 64.

At sub-stage 64, the sampling circuitry 36 looks up a most visible point for the sample span. The sampling circuitry 36 looks up the most visible point on the most visible point function that was computed at stage 54. The sampling circuitry looks up the most visible point for a pair of intensity values that comprise the intensity value for the front sampling point of the span and the intensity value of the back sampling point of the span.

The most visible point function returns a fraction between 0 (front sample) and 1 (back sample). The sampling circuitry 36 determines a point in the sample span using the fraction. The position of the determined point may be referred to as a most visible position, or a shading calculation position.

At sub-stage 66, the shading circuitry 38 calculates a value for a shading parameter at the shading calculation position.

In the present embodiment, the calculation of the shading parameter value comprises calculating a gradient in a gradient region surrounding the shading calculation position. The gradient region is a 4 voxel×4 voxel×4 voxel cube centered around the gradient position, although any other suitable size or shape of gradient region may be used in other embodiments (for example, in some embodiments, the gradient region may be any size from a 2 voxel×2 voxel×2 voxel cube up to the whole image volume). A gradient value is determined for the sample point by processing the intensity values of the voxels of the gradient region. The gradient value represents the rate of a change in three dimensions of intensity values within the gradient region. If there is a clearly defined surface present within the gradient region, the gradient value will for example represent the steepness and orientation of the surface.

The shading circuitry 38 calculates the value for the shading parameter based on the gradient. The value for the shading parameter may comprise a grayscale value, such that a high value for the shading parameter results in a darkened pixel.

The shading circuitry 38 composites a shading value for the sample span with the color value for the sample span. The shading value, which is evaluated at only one point along the sample span, is applied to the value produced by the pre-integration of the whole integration span. Shading may comprise one modulation for diffuse reflection and one addition for a specular component.

Sub-stages 58 to 66 are repeated for each sample span of each ray. Color and opacity for the sample spans of each ray are accumulated in accordance with a standard ray casting procedure to obtain a pixel color value for each ray.

The rendering circuitry 40 outputs an image that has been rendered from the volumetric imaging data set using the pre-integration integrals obtained at sub-stage 60 and shading values obtained at sub-stage 66.

The image obtained using the method of FIG. 7 may have improved image quality when compared to a method in which, for example, shading was calculated at fixed grid points. Artifacts may be reduced.

In some circumstances, there may be an issue with the consistency of the sampled surface across adjacent pixels (adjacent rays). Integrating in spans may mean that there is no longer a single point that represents a sample. Forming a double integral and integrating lighting across a span may be complex and expensive.

Determining the position of a shading evaluation point in a span may in some circumstances be expensive to compute in place. However, as described above, the determining of the position of the shading evaluation point may be precomputable. For example, a most visible point may be precomputed during the generation of the pre-integrated transfer function.

The shading calculation position may then be looked up using a pre-computed function (for example, the most visible point function described above).

An image quality issue may be solved in a way that is precomputable and has little or no impact on the complexity or performance of a rendering algorithm.

The method of FIG. 7 may create a smooth manifold that may be suitable for traditional shading and/or global illumination.

To make the method completely continuous, a linear opacity model may also be added between transfer function elements as described above with reference to stages 50 and 54. A function that is only dependent on opacity (for example, the sub-element visibility function) may be used to refine a position for the shading calculation. For example the sub-element visibility function may be used for sub-intervals in which there is only a difference of 1 between the colors values of the front sampling point and the back sampling point.

The use of the linear opacity model may improve the shading even for sharply-varying transfer functions, for example in which an opacity value of a gray level of x and an opacity level at a gray level of x+1 or x−1 are greatly different. The linear opacity model may be used by precomputing a table of the most visible point as a function of a pair of discretized opacity values (a0, a1), for example as shown in FIG. 8. FIG. 8 shows the precomputed static function that maps the points in between transfer function samples.

In some circumstances, the use of the linear opacity model to refine the shading position calculation may increase accuracy to a point that may not always be required. In some embodiments, no linear opacity model is used. Stage 50 of FIG. 7 is omitted. At stage 54, the most visible point function is calculated based on the transfer function and is not refined using a sub-element visibility function.

In further embodiments, shading calculation positions are determined using a function that is only dependent on front sample opacity and back sample opacity. For example, in one embodiment, the sampling circuitry 36 uses the transfer function to obtain an opacity value for the front sampling point based on the intensity value for the front sampling point, and to obtain an opacity value for the back sampling point based on the intensity value for the back sampling point. The sampling circuitry 36 then uses the sub-element visibility function of FIG. 8 to determine a shading calculation position in the span. In some circumstances, method for shading calculation positions based on front sample opacity and back sample opacity values may be less accurate than, for example, methods that use a linear intensity model for sub-sampling points and then use opacity for sub-intervals. However, in some circumstances, basing the shading calculation position only on opacity may provide acceptable image quality.

In the embodiment described above with reference to FIG. 7, the sub-element visibility function is calculated for the full range of possible opacities (0% to 100%) for each sampling point, and the most visible point function is calculated for the full range of possible gray levels (for example, 0 to 120) for each sampling point.

In other embodiments, only a sparse set of the grey level range in the transfer function is covered by one or more partial most visible point functions. For example, it may be known that artifacts tend to occur in particular grey level ranges. In some circumstances, a most visible point function may be calculated only for grey levels in which artifacts have been found to occur. If the transfer function is transparent for large portions, the pre-calculation circuitry 34 may avoid calculation those portions of the most visible point function (which may take time to compute and cost memory to store).

In some embodiments, shading is calculated at most visible points for one part of an intensity range and/or opacity range. For another part of the intensity range and/or opacity range, shading is calculated at the sampling points, for example without any most visible point being determined.

In some embodiments, a different method for determining the most visible point is used for different parts of an intensity range and/or opacity range. For example, in one part of the range, most visible point may be based on opacity alone. In another part of the range, most visible point may be based on intensity value. In some embodiments, the parts of the ranges to cover are determined by estimating how well the static sub-element visibility map can be used for each part of the range.

In some embodiments, an error metric is used to determine which shading evaluation method to use, for example whether to use the most visible point function and/or the sub-element visibility function. For example, an error metric may compare a given shading evaluation method to a full shading evaluation method using the most visible point function refined by the sub-element visibility function as described above. The error metric may be based on a distance from what the full method would predict. In other embodiments, an error metric may be based on an impact on a pixel value, given voxel data.

In embodiments above, visibility functions are pre-calculated. Shading evaluation points are obtained by looking up a pre-calculated function (for example, an image or look-up table) that is representative of the visibility function. In other embodiments, some or all of the pre-calculation may be omitted. Shading evaluation points may be calculated as needed, for example by applying a linear intensity model or linear opacity model to a given span.

Certain embodiments provide a medical imaging method comprising: a SVR or global illumination method using pre-integration; a shading function requiring a specific volumetric point; in which the most visible sub-sample point in the pre-integrated integral is pre-computed and used in the rendering method to determine where along the ray segment to evaluate the shading function.

A sub-element precision for the most visible fraction may be achieved by precomputing the most visible sub-element point as a function of front/back integration segment opacity. The gray values between the sample points may be estimated using a linear, quadratic or cubic polynomial. The precomputed sub-element visibility function may be filtered to prevent sharp transitions from front to back. Only a sparse set of the transfer function range may be covered by a set of partial most visible point maps. The ranges to cover may be determined by estimating how well a static map can be used for the whole range.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising:
processing circuitry configured to:
obtain volumetric data corresponding to a three dimensional region of a subject;
perform a sampling process that comprises sampling the volumetric data at a plurality of sampling points along a plurality of sampling paths;
store, for each of a plurality of intervals between the sampling points on the sampling paths, a most visible point function that relates intensity values at a front and a back of an interval to a most visible position within the interval,
for each of the plurality of intervals between the sampling points on the sampling paths,
determine a position of a shading evaluation point in the interval by using the stored most visible point function to determine the most visible position and using the most visible position as the shading evaluation point; and
determine a value for a shading parameter at the determined shading evaluation point; and
perform a rendering process using the determined values for the shading parameter at the determined shading evaluation points.

2. The apparatus according to claim 1, wherein the rendering process comprises at least one of global illumination and shaded direct volume rendering.

3. The apparatus according to claim 1, wherein the processing circuitry is further configured to store pre-computed positions for the shading evaluation point in each interval as a function of a front sampling point intensity value and/or a front sampling point opacity value and a back sampling point intensity value and/or a back sampling point opacity value.

4. The apparatus according to claim 3, wherein the determination of the position of the shading evaluation point in each interval comprises looking up the pre-computed position for the front sampling point intensity value and/or front sampling point opacity value and back sampling point intensity value and/or back sampling point opacity value for the interval.

5. The apparatus according to claim 3, wherein the pre-computed positions are stored as at least one of: an image, a function, and a look-up table.

6. The apparatus according to claim 1 wherein, for each interval:
the determination of the position of the shading evaluation point in the interval is based on an intensity value for a front sampling point and an intensity value from a back sampling point; and
the determination of the position of the shading evaluation point in the interval comprises an estimation of intensity values at a plurality of sub-sampling points within the interval and a determination of which of the sub-sampling points or sub-intervals between sub-sampling points is most visible.

7. The apparatus according to claim 6, wherein intensity values of the sub-sampling points are estimated using a linear, quadratic, or cubic polynomial.

8. The apparatus according to claim 6, wherein the determination of the position of the shading evaluation point in each interval further comprises:
a determination of a most visible sub-interval between sub-sampling points; and
a determination of a most visible position in the determined most visible sub-interval based on an opacity value for a sub-sampling point at a front of the determined most visible sub-interval and an opacity value for a sub-sampling point at a back of the determined most visible sub-interval.

9. The apparatus according to claim 8, wherein the determination of the most visible position in the determined most visible sub-interval comprises estimating intermediate opacity values between the sub-sampling point at the front of the determined most visible sub-interval and the sub-sampling point at the back of the determined most visible sub-interval.

10. The apparatus according to claim 9, wherein the intermediate opacity values are estimated using a linear, quadratic, or cubic polynomial.

11. The apparatus according to claim 1, wherein
the processing circuitry is further configured to store pre-computed positions for the shading evaluation point in each interval as a function of a front sampling point opacity value and a back sampling point opacity value, and
the pre-computed positions are filtered to reduce or prevent sharp transitions in a position between the front and the back of the interval.

12. The apparatus according to claim 1, wherein
a pre-computing of shading evaluation point fractions comprises or forms part of a pre-integration process, and
the pre-integration process comprises determination of a respective color value for each pair of intensity values by integration across an interval between sampling points having said intensity values.

13. The apparatus according to claim 1, wherein the determination of the position of the shading evaluation point in each interval is performed on a subset of a volumetric imaging data set.

14. The apparatus according to claim 13, wherein the processing circuitry is configured to select the subset on which to perform the determination of the position of the shading evaluation point based on at least one of: intensity values, a presence of anatomical features, an image quality, and a likelihood of artifacts.

15. The apparatus according to claim 1, wherein the determination of the position of the shading evaluation point in each interval is further based on an intensity value and/or opacity value for at least one further sampling point.

16. The apparatus according to claim 1, wherein the determination of the value for the shading parameter at the determined shading evaluation point in each interval comprises a calculation of a gradient at the determined shading evaluation point.

17. A medical image processing method comprising:
obtaining volumetric data corresponding to a three dimensional region of a subject;
performing a sampling process that comprises sampling the volumetric data at a plurality of sampling points along a plurality of sampling paths;
storing, for each of a plurality of intervals between sampling points on sampling paths, a most visible point function that relates intensity values at a front and a back of an interval to a most visible position within the interval,
for each of the plurality of intervals between the sampling points on the sampling paths,
determining a position of a shading evaluation point in the interval by using the stored most visible point function to determine the most visible position and using the most visible position as the shading evaluation point; and
determining a value for a shading parameter at the determined shading evaluation point; and
performing a rendering process using the determined values for the shading parameter at the determined shading evaluation points.

* * * * *